(12) United States Patent
Quintman et al.

(10) Patent No.: US 7,247,036 B2
(45) Date of Patent: Jul. 24, 2007

(54) FUEL TANK COMPONENT WITH WELDABLE CONNECTOR

(75) Inventors: Analis R. Quintman, Ann Arbor, MI (US); Lori L. Stephens, Shelby Township, MI (US)

(73) Assignee: Eaton Corportion, Cleveland, OH (US)

( * ) Notice: Subject to any disclaimer, the term of this patent is extended or adjusted under 35 U.S.C. 154(b) by 0 days.

(21) Appl. No.: 11/090,245

(22) Filed: Mar. 25, 2005

(65) Prior Publication Data

US 2006/0213915 A1 Sep. 28, 2006

(51) Int. Cl.
*H01R 4/58* (2006.01)
(52) U.S. Cl. .......................................... 439/86; 439/34
(58) Field of Classification Search ................. 439/34, 439/86, 736; 137/43, 202
See application file for complete search history.

(56) References Cited

U.S. PATENT DOCUMENTS

| | | |
|---|---|---|
| 6,422,261 B1 | 7/2002 | DeCapua |
| 6,431,200 B2 | 8/2002 | Brock et al. |
| 6,578,597 B2 | 6/2003 | Groom et al. |
| 6,623,682 B2 | 9/2003 | Amburgey et al. |
| 6,662,820 B2 | 12/2003 | Dunkle |
| 6,676,165 B2 | 1/2004 | Iio et al. |
| 6,679,282 B2 | 1/2004 | Aoki et al. |
| 6,679,297 B1 * | 1/2004 | Nishi et al. .................. 138/137 |
| 6,701,950 B2 | 3/2004 | Brock |
| 6,863,315 B2 * | 3/2005 | Sadr ........................... 285/189 |
| 6,866,297 B2 | 3/2005 | Morohoshi et al. |
| 6,895,998 B2 | 5/2005 | Aoki |
| 6,905,147 B2 | 6/2005 | Kertesz |
| 2002/0047017 A1 | 4/2002 | Goto |
| 2003/0037831 A1 | 2/2003 | Nakamura |
| 2004/0047017 A1 | 3/2004 | Goto |
| 2004/0094200 A1 | 5/2004 | Aoki |
| 2004/0239112 A1 | 12/2004 | Kertesz |

\* cited by examiner

*Primary Examiner*—Khiem Nguyen
(74) *Attorney, Agent, or Firm*—Anna M. Shih

(57) ABSTRACT

A fuel tank component has a weldable connector that is connected to a housing via a secure chemical bond. The connector and the housing are modified so that they bond to each other. The interface between the connector and the housing may be stepped to increase its surface area and thereby increase the strength of the chemical bond. The chemical bond in the inventive valve eliminates the need to include complex interlocking geometries in either the connector or the housing and reduces the complexity of the tooling needed to mold the component.

13 Claims, 4 Drawing Sheets

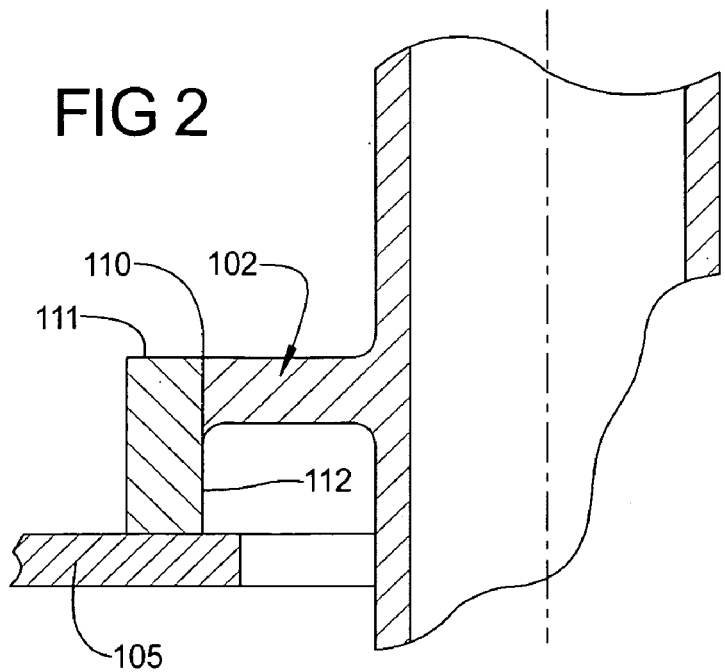
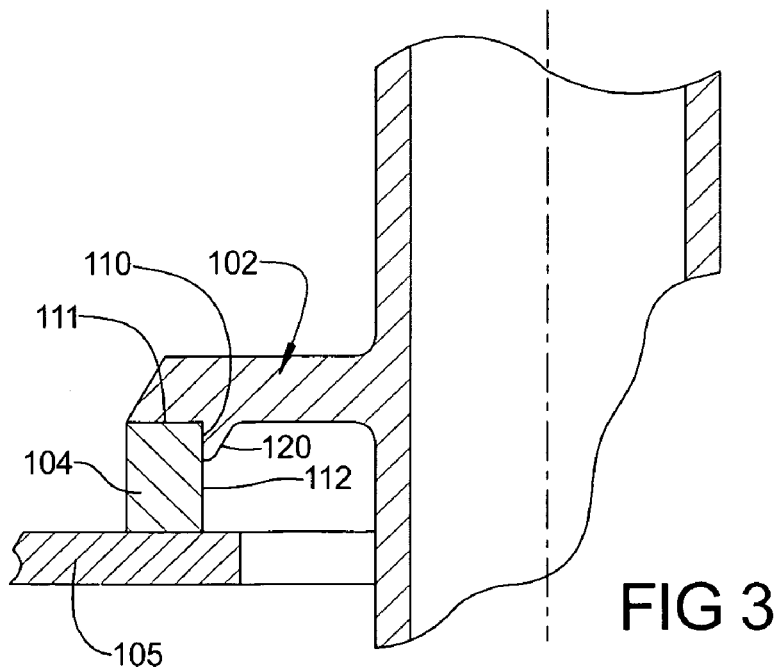

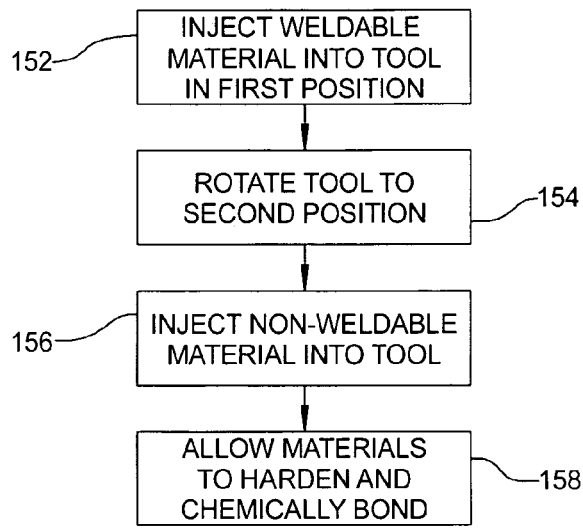
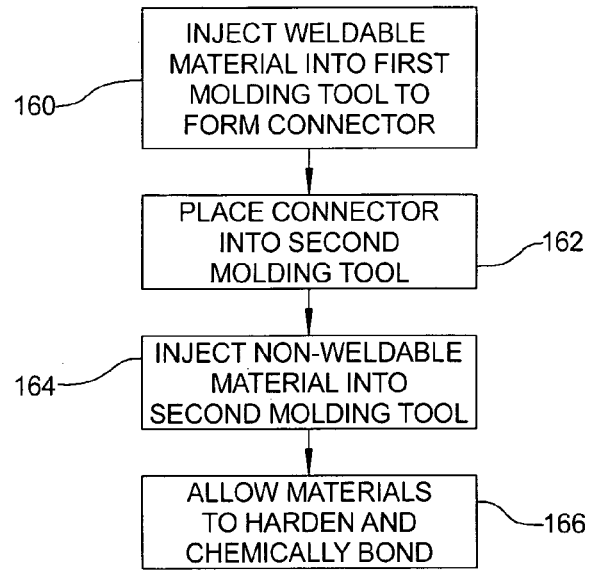

FUEL TANK COMPONENT WITH WELDABLE CONNECTOR

TECHNICAL FIELD

The present invention relates to fuel tank components that are attachable to polymeric fuel tanks, and more specifically to a fuel tank component having two portions made of dissimilar materials that are bonded to one another, one of which is weldable to the fuel tank, the other of which is a barrier to hydrocarbon permeation.

BACKGROUND OF THE INVENTION

Fuel tanks are increasingly being manufactured out of weldable polymer materials, such as polyethylene, that lend to efficient manufacturing processes such as blow-molding. The use of these fuel tanks is becoming widespread; however, the prior art has not yet disclosed a suitable structure for connecting fuel tank components to such polymeric tanks. Materials that lend themselves to efficient manufacture of polymeric fuel tanks typically are not suitable for making quality fuel tank components because they are frequently too soft and are subject to long term creep problems.

Moreover, the preferred method for attaching components to polymeric fuel tanks has been to weld them using well-known techniques, such as hot plate welding. The high temperatures used in the welding process can damage components made largely or entirely out of the same material as the fuel tank. However, harder, higher-melting temperature materials such as nylon, which are suitable for use in component construction, are difficult if not impossible to weld to polymeric fuel tanks. For example, polyethylene and nylon simply do not weld well to each other due to their different melting temperatures and other properties.

Moreover, any component that is attached to the tank must be a good hydrocarbon barrier to meet environmental regulations. Weldable materials generally do not make good barriers. To address these multiple requirements, one proposed solution involves providing a fuel tank component made of suitable barrier material, such as nylon, with a weldable connector. The weldable connector is then welded to the fuel tank, thereby attaching the entire component to the fuel tank. One method for providing a weldable connector on the component body involves overmolding a weldable connector onto an upper portion of the component housing (or vice versa). This connector is initially manufactured as a component separate from the housing and has a different melting temperature and welding properties than the component housing to allow it to be easily welded to the fuel tank.

The connector and the component housing must be securely connected to each other to prevent fuel vapor permeation, fuel wicking between the connector and the housing, and mechanical separation of the connector from the housing. However, certain problems are inherent in attempting to connect or mold the weldable material of the connector to the non-weldable material of the housing. The materials normally used, such as polyethylene and nylon, typically do not adhere very well, resulting in a weak interface between the two.

Currently known structures rely on a mechanical interlocking connection between the connector and the component housing via overmolding or insert molding to create a more secure interface. The interlocking connection causes at least a portion of the connector to be surrounded by the component housing or vice versa, but in either case, the complicated configuration needed to form the interlocking connection requires complex tooling that increases the manufacturing cost of the component.

There is a desire for a component structure that provides improved sealing and connection properties between the housing and the connector and that is simpler and less expensive to manufacture than currently existing structures requiring an interlocking connection between the housing and the connector.

SUMMARY OF THE INVENTION

The present invention is directed to a fuel tank component having a weldable connector that is connected to a component housing by a secure chemical bond instead of a mechanical interlocking structure. The connector portion and the housing are preferably both made out of materials that are modified to chemically bond to each other. The materials may also be selected and/or modified to have conductive properties to dissipate any electrical charge that may accumulate in the component. In one embodiment, the interface between the connector and the housing is stepped to increase the surface area of the interface between the housing and the connector.

The chemical bond in the inventive fuel tank component simplifies the process for manufacturing the component by allowing the component to be manufactured using a two-shot molding process in the same mold. Alternatively, the component can be manufactured through an insert molding process. In either case, the chemical bond and lack of mechanical interlocking between the connector and the housing simplifies the configuration of both, reducing the complexity of the tooling needed to mold the component and hence the cost.

BRIEF DESCRIPTION OF THE DRAWINGS

FIG. 2 is a representative section view of the component according to another embodiment of the invention;

FIG. 3 is a representative section view of the component according to another embodiment of the invention;

FIG. 6 is a flow diagram of a fuel tank component manufacturing process according to one embodiment of the invention;

FIG. 7 is a flow diagram of a component manufacturing process according to another embodiment of the invention.

DETAILED DESCRIPTION OF THE EMBODIMENTS

Figure 1:
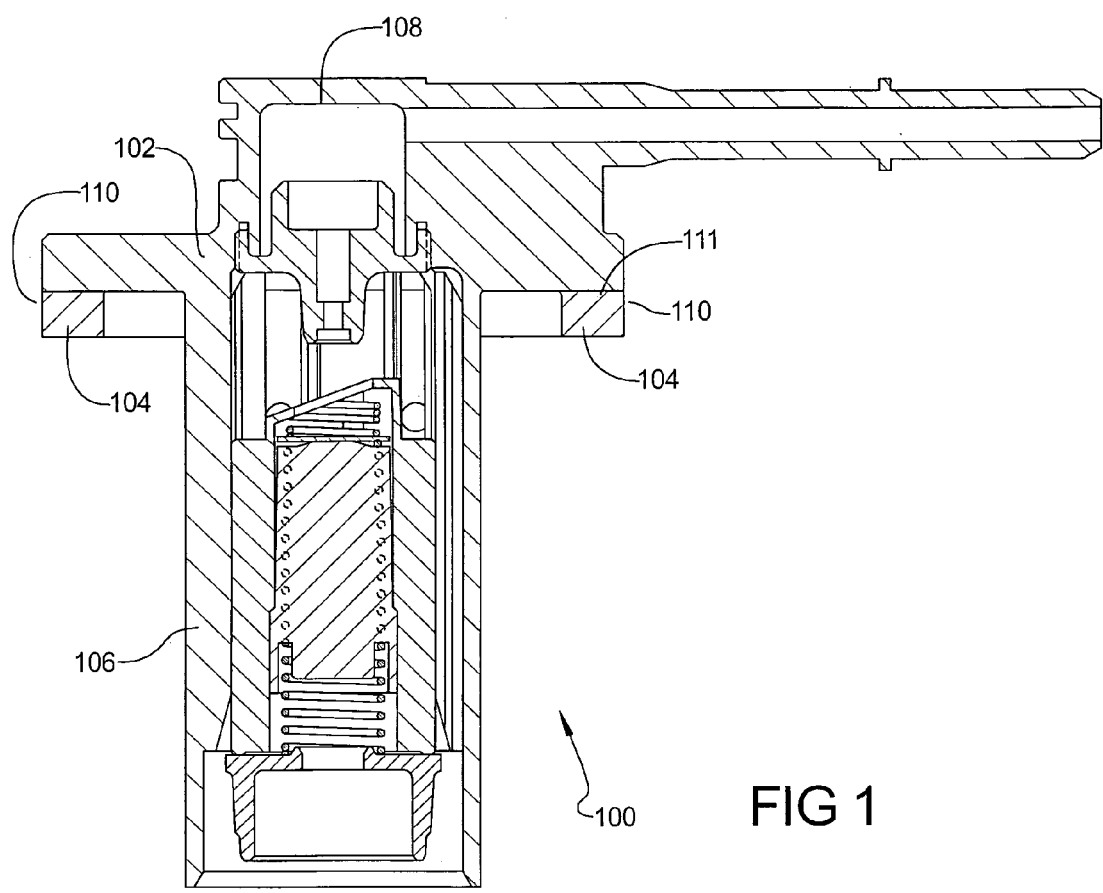
FIG. 1 is a representative section view of a fuel tank component having a housing and connector structural relationship according to one embodiment of the invention.

The invention is generally directed to a fuel tank component 100, such as a vent valve, inlet valve, check valve, or other component having a component housing 102 with a weldable connector 104 designed to connect the component 100 to an outer surface of a polymeric fuel tank 105 (shown in FIGS. 2 through 5). The housing 102 has a cylindrical lower portion 106 designed to extend into the fuel tank, and an upper portion 108 designed to extend outside the fuel tank. The component 100 itself may take any form; for example, it can be designed to vent fuel vapor from the interior of the fuel tank to the atmosphere or external vapor-treating structure. In one example, the component 100 is typically hollow, with suitable apertures and vapor pathways connecting the lower and upper portions of the main component housing 102, terminating in a vent outlet in the upper portion of the housing 102. The component 100 can, for example, be a rollover valve, a head valve, a fill control valve, or any other known component structure for venting fuel vapor from the tank or controlling fuel flow to and/or from the tank. The housing 102 can be formed of any suitable polymer material that is sufficiently heat-resistant to withstand the temperatures involved in welding techniques, such as hot-plate welding, and that has a chemical composition suitable for chemical bonding.

The weldable connector 104 is connected to the housing 102 so that at least a portion of the connector 104 can be welded to the fuel tank 105 when the component 100 is operatively positioned within the fuel tank aperture. The weldable connector 104 can surround the vent outlet structure of the upper portion of the housing 102 or can itself provide an extension of the vent outlet, such as a nozzle conduit extending from the vent outlet for connection to a vapor canister (not shown). The connector 104 is formed from a material that can be welded to fuel tank wall 105.

To install the component 100 onto the fuel tank, the connector 104 is seated around an aperture on the fuel tank and then welded to the fuel tank wall 105 using a suitable known technique, such as hot plate welding. Once the connector 104 has been welded to the fuel tank, the housing 102 and its associated component structure are operatively fastened to fuel tank in a secure, fluid- and vapor-tight manner. Specifically, the weldable connector 104 is effectively integrated into fuel tank wall 105 by the welding process. The chemical bond between the housing 102 and the connector 104 securely locks the housing 102 to the connector 104, and thus to the fuel tank. The welded seam between the connector 104 and the fuel tank prevents any fuel vapor or fluid fuel leakage because the connector 104 effectively becomes part of the fuel tank wall after it is welded to the fuel tank.

To ensure a secure chemical bond at an interface 110 between the connector 104 and the housing 102, the material used for the housing 102 is preferably a chemical bond grade polymer, such as an amino group rich polyamide. The housing material is preferably electrically conductive and has low hydrocarbon permeation characteristics. The material used for the connector 104 is formulated to bond securely with the housing material.

It is known in the art that polyethylene and nylon generally have poor adhesive qualities with respect to each other. To remedy this, in one embodiment, the material in the housing 102 is a non-weldable barrier material that is a polyamide resin, homopolymer or copolymer, having a terminal amino group concentration greater than a terminal carboxyl group concentration, such as chemical bond grade nylon 6, nylon 6, nylon 11, nylon 12, or other similar material. It will be understood by those skilled in the art that other materials can be used as long as they are capable of withstanding the welding environment temperatures generated in fastening the component 100 to the softer, lower melting temperature fuel tank. Further, the material in the connector 104 may be any appropriate polymer that can chemically bond with the housing material. In one embodiment, the connector 104 is made of polyolefin resin that has been modified with an unsaturated carboxylic anhydride.

In one embodiment, a modified high-density polyethylene (HDPE), such as HDPE blended with an unsaturated carboxylic acid, such as maleic anhydride or other adhesive plastic, is used as the polyolefin resin used to form the connector 104. Modifying the HDPE in this manner makes the connector 104 material chemically compatible with the housing 102 material to create a chemical bond between the two materials. If desired, the polyamide and/or polyolefin resins may include additives to improve their conductive characteristics (e.g., to dissipate electric charge) and/or to improve its resistance to hydrocarbon permeation. The term "conductive" as used in this description refers to both conductive and dissipative characteristics. Possible additives include carbon and stainless steel, but other additives may be used as well. Regardless of the specific formulations used in the housing barrier material and the connector material, the modifications used to improve adhesion between the two materials are preferably conducted at the molecular level to provided a firm chemical bond while still retaining good permeation performance.

This secure chemical bonding at the interface 110 allows the connector 104 in the embodiment of FIG. 1 to be a simple ring attached to the upper portion 108 of the housing 102. In this embodiment, the mating surfaces of the connector 104 and the housing 102 are flat, allowing the connector 104 to contact a top surface 111 of the connector 111 to form the interface 110. Thus, the connector 104 and housing 102 are held together purely by a chemical bond, without mechanical interlocking or coupling.

FIGS. 2 through 5 illustrate configurations of the component structure according to other possible embodiments of the invention. Like the embodiment shown in FIG. 1, the embodiments shown in FIGS. 2 through 5 have the connector 104 chemically bonded to the housing 102 without any mechanical interlocking, making them cost-effective and simple to manufacture.

FIG. 2 is a side section view of another possible configuration taking advantage of the simplified profile of the interface 110 between the connector 104 and the housing 102 that is made possible by chemical bonding. In this embodiment, the connector 102 is also ring-shaped, similar to the connector 102 in the first embodiment. However, in the embodiment shown in FIG. 2, the interface 110 is disposed on an interior surface 112 of the ring-shaped connector 104 rather than on its top surface 111. The chemical bonding at the flat interface 110 allows the connector 104 and the housing 102 to be held securely together without mechanical interlocking.

Figure 4:
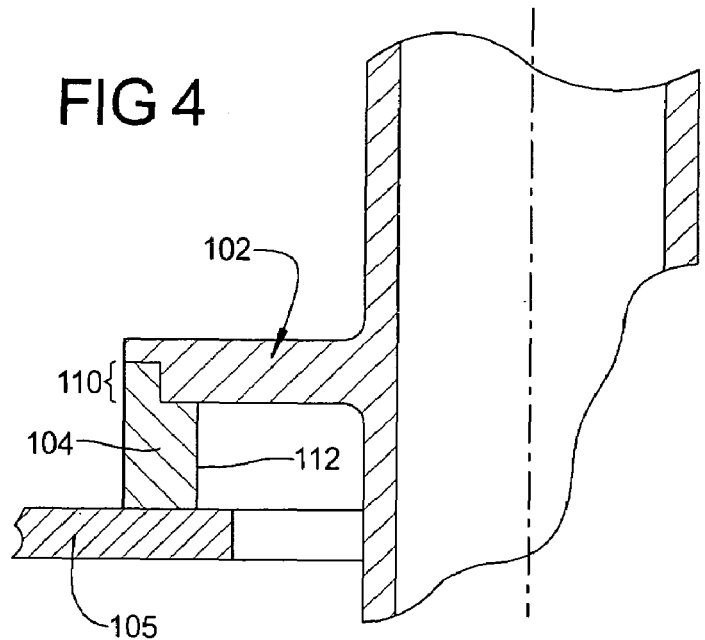
FIG. 4 is a representative section view of the component according to another embodiment of the invention.
Figure 5:
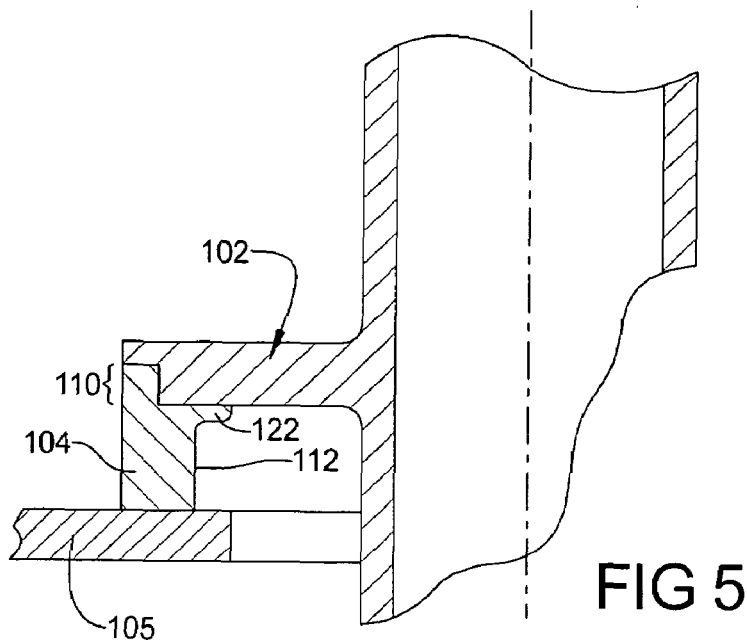
FIG. 5 is a representative section view of the component according to another embodiment of the invention.

To improve the strength of the chemical bond between the connector 104 and the housing 102, the profiles of the connector 104 and/or housing 102 may be modified in any simple manner to increase the surface area of the interface 110. FIGS. 3, 4 and 5 all show configurations where the interface 110 is stepped to increase its surface area. The embodiment in FIG. 3 is similar to the embodiment in FIG. 1 except that the housing 102 has a small foot 120 that extends downward to contact the interior surface 112 as well. Even with this modification, both the connector 104 and the housing 102 still can have a simple configuration because the foot 120 only increases the surface area of the interface 110 without creating any mechanical interlocking relationship between the connector 104 and the housing 102.

Due to the formulation of the plastics used to form the connector 104 and the housing 102, the component 100 can be securely held together via the chemical bond at the interface 110 alone.

FIG. 4 is another possible embodiment where both the connector 104 and the housing 102 are shaped to form a simple stepped profile at the interface 110. This stepped profile further increases the surface area of the interface 110, thereby increasing the strength of the chemical bond at the interface 110. Note, however, that the stepped profile of the interface 110 still does not mechanically interlock the connector 104 and the housing 102; it can be clearly seen in FIG. 4 that without the chemical bond, the connector 104 and the housing 102 would completely separate from each other.

FIG. 5 is yet another possible embodiment for the interface 110. This configuration is also a stepped interface, but the surface area of the interface 110 is increased further by including a protrusion 122 that extends from the interior surface 112 of the connector 104. The protrusion 122 provides an additional contact surface for strengthening the chemical bond between the connector 104 and the housing 102 without interlocking the two. Because the chemical bond at the interface 110 is strong due to the material properties of the connector 104 and the housing 102, the interface profile 110 can be kept very simple, even with the stepped configuration, because no mechanical interlocking is needed to hold the component 100 together.

As can be seen in the figures, the inventive component configuration does not require any portion of the connector 104 to be encapsulated by the housing 102 or vice versa. Instead, the profile of the interface 110 can be kept simple because the primary design concern at the interface 110 is the desired amount of surface area for the chemical bond at the interface 110. This lack of mechanical interlocking in the inventive component structure eliminates the need to overmold the connector 104 onto the housing 102 or the housing 102 onto the connector 104, reducing the complexity, and therefore the cost, of the tooling used to manufacture the component 100.

FIG. 6 is a flow diagram illustrating a manufacturing method 150 according to one embodiment of the invention. The method 150 can be conducted via a two-shot molding process, an insert molding process, or any other appropriate manufacturing process that allows the chemical bond to form at the interface 110. The method 150 illustrated in FIG. 6 may be a two-shot molding process 151 that includes the steps of injecting a non-weldable material into a molding tool disposed in a first position to form the connector 104 (block 152), moving (e.g., rotating) the tool to a second position (block 154), then injecting a weldable material in the same tool to form the housing (block 156). Note that although the embodiment in FIG. 6 molds the connector 104 first and the housing 102 second, the housing 102 may be molded first instead without departing from the scope of the invention.

Once the connector 104 and the housing 102 have been formed in the molding tool, the resulting component 100 is cooled and hardened in any known manner (block 158). In one embodiment, the second material is injected into the mold before the first material hardens completely to encourage adhesion and chemical bonding of the two materials. The two-shot molding process allows the two dissimilar materials used to form the housing 102 and the connector 104, respectively, to shrink simultaneously during manufacturing, reducing internal molding stresses within the component 100.

Alternatively, as shown in FIG. 7, one of the components (i.e., the housing 102 or the connector 104) may be manufactured in a first molding tool (block 160), removed from the first molding tool, and placed into a second molding tool (block 162). The other component is then molded in the second molding tool (block 164) and the two materials are allowed to cool and harden as before (block 166) to form the interface 110 in an insert molding process.

Regardless of the specific molding process used, the interface 110 joining the connector 104 to the housing 102 is a pure chemical bond due to the adhesive properties of the materials as described above. In other words, there is no need for an overmolding process per se to mechanically interlock the connector 104 and the housing 102. The specific conditions needed to form the chemical bond is a function of the temperature and pressure used during molding and are adjusted to actuate bonding. For example, the proper temperature for a given polymer depends on the specific characteristics of that material (e.g., including additives to a polymer may raise the critical temperature for creating the chemical bond; for modified nylon, for example, the critical temperature may be in the range of 285 degrees Celsius and 305 degrees Celsius). In one embodiment, the critical temperature of the polymer that is injected second is the important temperature for facilitating bonding.

Shearing action at the interface 110 during injection also controls the quality of the chemical bond. The pressure at which the polymer(s) exit a gate into the molding tool creates shear, and placing the gate near the interface 110 ensures good shear at the interface 110 to strengthen the bond. The molding tool should also be vented via any known manner to prevent air from being trapped in the interface 110.

Eliminating the need to configure the connector 104 and/or the housing 102 to have a complex profile for mechanical interlocking of the connector 104 and housing 102 allows the tooling for both components to be simplified, reducing manufacturing cost. Moreover, relying on chemical bonding rather than mechanical bonding eliminates the need to include extra weldable material in the connector 104 solely for interlocking purposes.

By creating a component structure that uses does not require any interlocking or mechanical coupling between the weldable ring and the non-weldable component housing, the inventive structure and method allows the component to be easily manufactured using a two-shot molding process. The chemical bond between the ring and the housing allows both the ring and the component housing to have a simpler structure that does not require overmolding of either the ring over the component housing over the ring, making the tooling for manufacturing the component less complex. Instead, the weldable connector can be manufactured with a simple configuration that is simply bonded to the component housing during the component molding process, reducing manufacturing cost. Moreover, the connector may be formed with less material because the interlocking area is eliminated.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel tank component for attachment to a polymeric fuel tank, comprising:
   a housing made of a first polymer that is not weldable to the fuel tank, wherein the first polymer is a barrier to hydrocarbon permeation; and
   a connector made of a second polymer that is weldable to the polymeric fuel tank, wherein the connector is connected to the housing via a chemically-bonded adhesive interface with no mechanical interlocking,
   wherein at least one of the first polymer and the second polymer are electrically conductive.

2. The fuel tank component of claim 1, wherein the first polymer is formulated to bond with the second polymer.

3. The fuel tank component of claim 2, wherein the first polymer is a polyamide resin having a terminal amino group concentration greater than a terminal carboxyl group concentration.

4. The fuel tank component of claim 2, wherein the first polymer comprises polyamide.

5. The fuel tank component of claim 1, wherein the second polymer comprises an adhesive plastic.

6. The fuel tank component of claim 5, wherein the second polymer comprises polyethylene modified with an unsaturated carboxylic acid.

7. The fuel tank component of claim 1, wherein the connector is substantially annular and has a top surface and an interior surface, and wherein the interface is at the top surface of the connector.

8. The fuel tank component of claim 7, wherein the housing further includes a foot that contacts at least a portion of the interior surface of the connector such that the interface is at the top surface and at least a portion of the interior surface of the connector.

9. The fuel tank component of claim 1, wherein the connector is substantially annular, and wherein the interface has a stepped profile.

10. The fuel tank component of claim 9, wherein the connector comprises a protrusion that extends from an interior surface of the connector and contacts the housing to form part of the interface.

11. A fuel tank component for attachment to a polymeric fuel tank, comprising:
    a housing made of a first polymer that is not weldable to the fuel tank, wherein the first polymer is a barrier to hydrocarbon permeation and is a polyamide resin having a terminal amino group concentration greater than a terminal carboxyl group concentration; and
    a connector made of a second polymer that is weldable to the polymeric fuel tank and that is formulated to chemically bond with the first polymer, wherein the connector is connected to the housing via a chemically-bonded adhesive interface with no mechanical interlocking,
    wherein at least one of the first polymer and the second polymer is electrically conductive.

12. The fuel tank component of claim 11, wherein the first polymer comprises polyamide.

13. The fuel tank component of claim 11, wherein the second polymer comprises polyethylene modified with an unsaturated carboxylic acid.

* * * * *